United States Patent [19]

Parkyn

[11] Patent Number: 4,675,725
[45] Date of Patent: Jun. 23, 1987

[54] IMAGE SUPERIMPOSING SYSTEM

[75] Inventor: Derek J. Parkyn, Sevenoaks, England

[73] Assignee: Crosfield Electronics Limited, United Kingdom

[21] Appl. No.: 642,867

[22] Filed: Aug. 21, 1984

[30] Foreign Application Priority Data

Aug. 22, 1983 [GB] United Kingdom ............... 8322552

[51] Int. Cl.$^4$ .......................... H04N 9/76; H04N 1/46
[52] U.S. Cl. ........................................ 358/22; 358/75; 358/78; 358/182; 358/183
[58] Field of Search .................... 358/75, 78, 22, 183, 358/182, 36, 37, 166, 167, 81, 80

[56] References Cited

U.S. PATENT DOCUMENTS 3,764,732 10/1973 Macheboeuf ........................ 358/22
4,334,245 6/1982 Michael ............................... 358/183

Primary Examiner—James J. Groody
Assistant Examiner—Robert M. Bauer
Attorney, Agent, or Firm—Sughrue, Mion, Zinn, Macpeak, and Seas

[57] ABSTRACT

This relates to the modification of the whole, or a substantial part, of an image, for example to the merging of two images or to applying a tint to an image. To achieve this, using only the normal data processing capability provided for handling a single image, two images ($I_1$, $I_2$) are stored in first and second portions of a normal image store; for example, if the normal image store has a capacity of $1024^2$ pixels, each image may be stored at a resolution of $512^2$ pixels. In a further 1-bit store there is stored a mask consisting of alternate 1's and 0's and the mask output is used to select pixels from the two portions of the image store alternately. The mask output also selects multiplying factors A and (1-A) alternately. Then each pixel from the first image, after multiplication by A, is added to an immediately succeeding pixel from the second image after its multiplication by (1-A). The resulting sum signals are used to control an image display (34). This achieves merging of two images within the normal data processing capability provided for one image. When a tint is to be applied to the first image, the same value is used for each pixel of the second "image".

6 Claims, 2 Drawing Figures

IMAGE SUPERIMPOSING SYSTEM

This invention relates to the modification of the whole or a substantial part of an image, irrespective of the colour of the pixels within the image or image part, and is to be distinguished from the colour correction of all pixels of a given colour in the image or in a part of the image, and from insetting of one image or image part into a space created in another image by masking the corresponding part of the other image. As examples, the invention relates to merging two images, or applying a coloured tint over the whole of an image.

Figure 1:
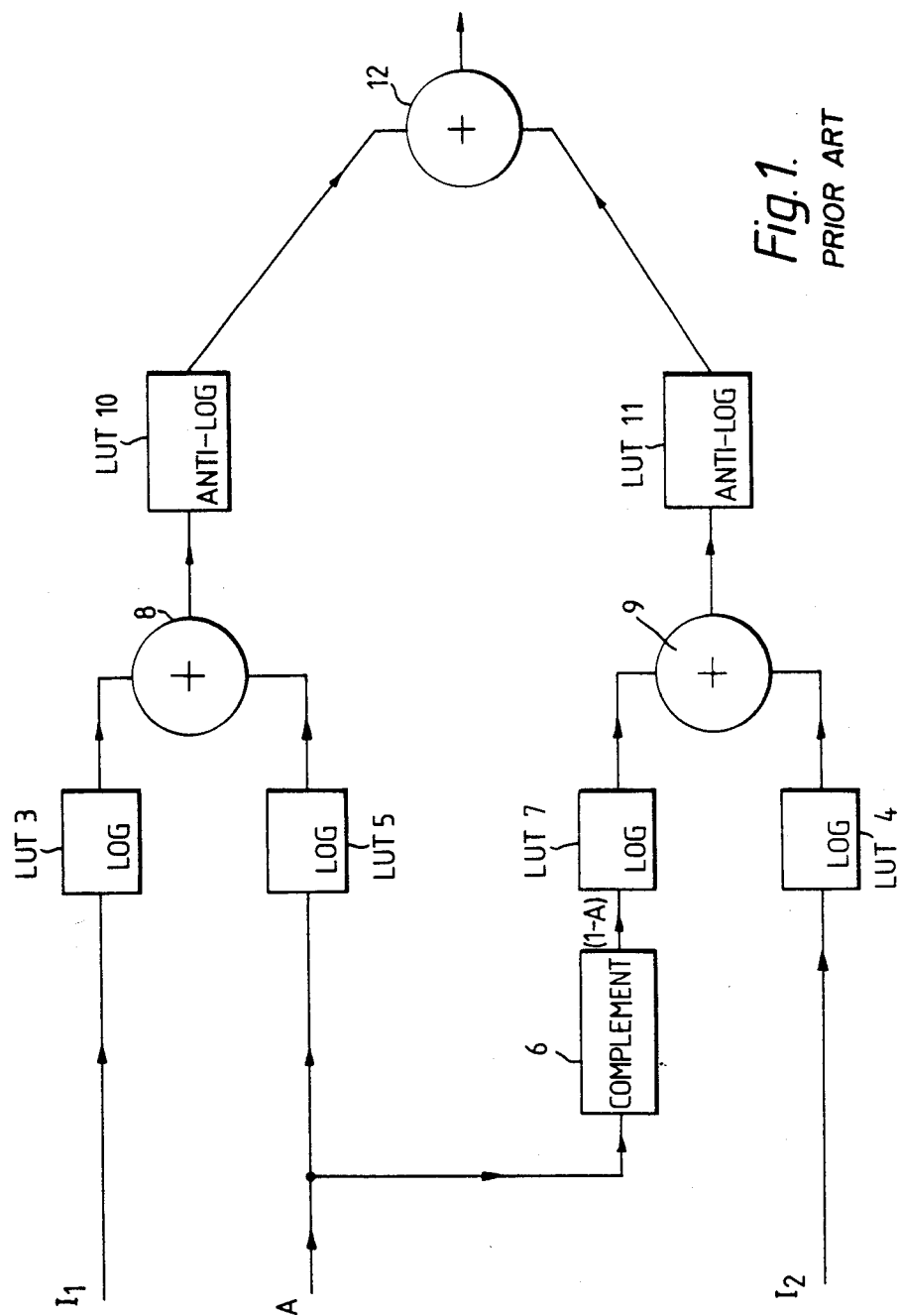

One known method of merging two images is shown in FIG. 1. Essentially, this involves the multiplication of each pixel value by a predetermined factor and because multiplication requires a substantial time in the computer, a method emplying logarithmic and antilogarithmic look-up tables is shown.

In FIG. 1, the first image signal $I_1$ and the second image signal $I_2$ are applied respectively to look-up tables LUT 3 and LUT 4. These look-up tables are loaded with values such that the output is the logarithm of the input.

A signal A which lies between 0 and 1 and which determines the relative amounts of the two images in the final merged image is applied to a further logarithmic look-up table, namely LUT 5 and also to a complementing unit 6, the output (1-A) from which is applied to a further logarithmic look-up table LUT 7. An adding circuit 8 receiving the outputs of LUT 3 and LUT 5 provides an output representing ($\log I_1 + \log A$). Similarly, an adder 9 receiving the outputs of LUT 4 and LUT 7 provides an output representing ($\log I_2 + \log (1-A)$).

LUT 10 and LUT 11 are each loaded with an antilogarithmic function and receive respectively the outputs of adders 8 and 9. Consequently, their outputs are respectively $I_1 A$ and $I_2(1-A)$. These outputs are summed in an adder 12 to provide a signal representing the value for that picture element of the merged images.

If instead of two merged images, a tint is required with the single image $I_1$, the $I_2$ channel in the above description is replaced by a constant signal, so that a constant amount of colour is added to all of the single image $I_1$.

If the effect of a transparent coating is required, the second channel ($I_2$) is not used, the required output signal being the sum of $I_1$ and $f(A)$.

It will be appreciated that in an electronic retouching system for a coloured image, which is to be reproduced with printing inks, and in which colour-signal video data is modified while the result of the modifications is observed on a monitor display, the resolution of the signal data on which the modifications are carried out is far less than the resolution required for a normal ink reproduction. This is because firstly the high resolution of an ink reproduction is not required and indeed would be wasted on a conventional monitor display; and secondly the data-processing time required for making the modifications at such a high resolution with presently available computers would be intolerable in an interactive retouching system. Typically, the image data for use in electronic retouching is held in a ($1024 \times 1024$) location store, each location storing for example eight digits for the colour value. Naturally, the processing capability of the circuits to which the signals from the store are applied is matched to the store content. To achieve operation as disclosed above with reference to FIG. 1 would require nearly three times as much processing ability as is normally required for single image retouching. Also, video data printed circuit boards designed to handle a single image from one store do not naturally yield two co-existing image outputs.

The object of the present invention is to enable data processing circuits matched to a single-image store to provide an image which has been modified by merging it with a second image or providing a tint.

A method according to the present invention for modifying an image, or a significant part of the image, comprises storing two images in first and second portions of an image store; storing in a further 1-bit store, having the same number of locations as the image store, a mask consisting of alternate 1's and 0's; and using the mask output to select pixels from the two portions of the image store alternately and to select A and (1-A) as a multiplying factor, alternately, where $0 < A < 1$; and adding each pixel from the first image, after multiplying by A, to an immediately succeeding pixel from the second image after its multiplication by (1-A).

If a tint is to be applied to a single image, there is no second image to store and instead a constant value is used in place of the above-mentioned second image signal and is multiplied by the (1-A) factor. In this manner, a constant amount of colour is added to all of the first image.

Apparatus for modifying an image, or a significant part of the image, in accordance with the invention comprises: a first image store; a second image store; a mask store storing alternate ones and zeros; means responsive to the mask store to select the first and second image stores alternately in accordance with the stored ones and zeros; means responsive to the mask store to select respective multiplying factors A and (1-A) (where $0 < A < 1$) in accordance with the stored ones and zeros; arithmetic means for multiplying a first image pixel value $I_1$ by A and a value $I_2$ for an adjacent pixel of the second image by (1-A) and for adding the products; and means utilising the sum of the products to control an image display means.

Figure 2:
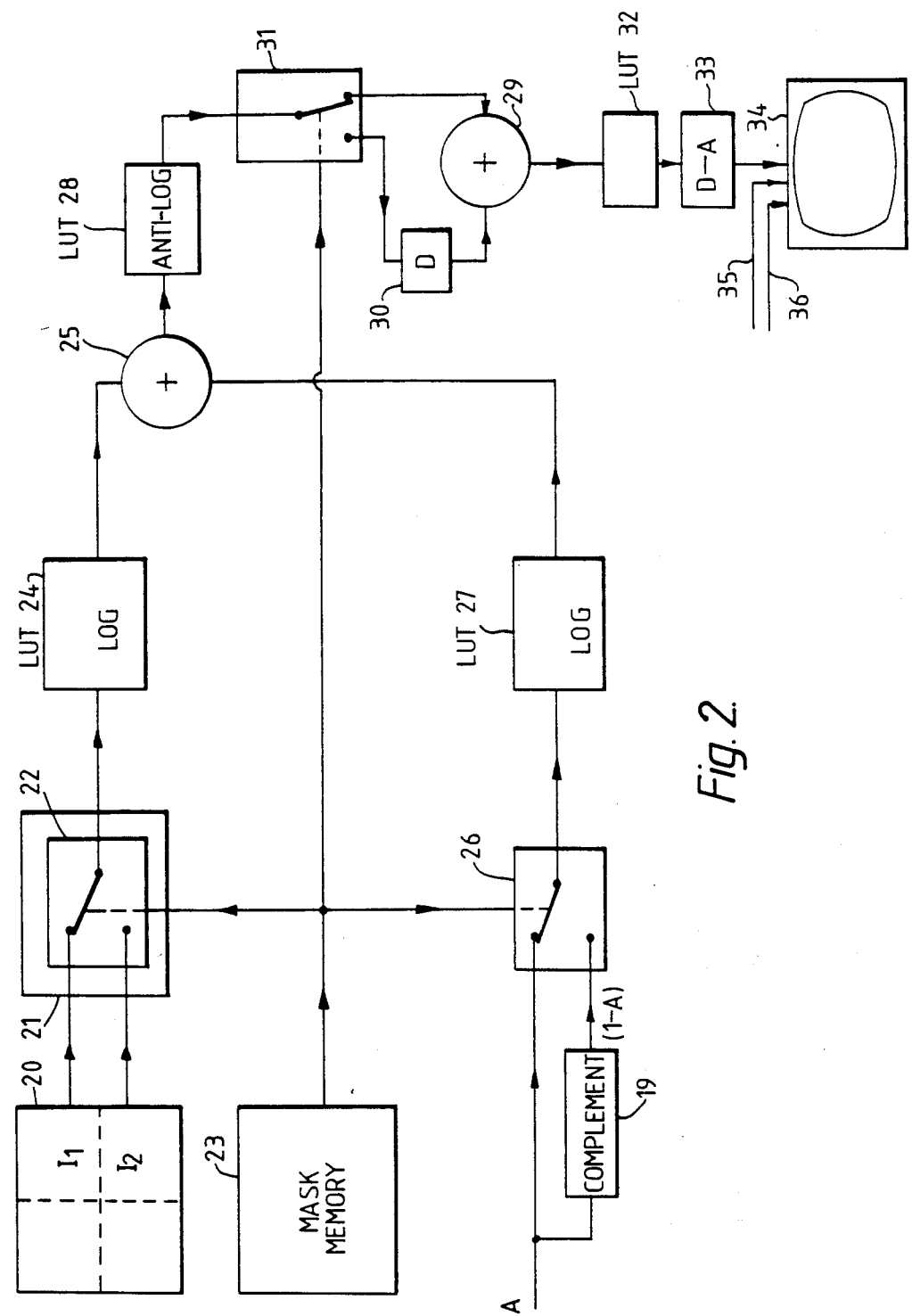

In the accompanying drawings,

FIG. 1 (which has already been described) illustrates one way of merging two images and FIG. 2 illustrates an example of an improved method of merging the two images in accordance with the present invention. In order that the invention may be better understood, this example will now be described with reference to FIG. 2. In FIG. 2, an image store 20 having a capacity of ($1024 \times 1024$) pixel values is divided into four portions, each with a capacity of ($512 \times 512$) pixel values. The values stored represent colour density for one of the display co-ordinates R, G or B (red, green or blue). Signals from two of these quarter sections are applied to a video data printed circuit board 21 which includes a switching circuit 22 permitting selection of either the first image output $I_1$ or the second image $I_2$ output from store 20.

A mask memory 23 has a capacity of ($1024 \times 1024$) but stores only a single bit in each location. store is so loaded that bits representing one set of alternate pixels are given a 1 value and bits representing the other set of alternate pixels are given a 0 value.

These 1 and 0 values from the mask memory 23 are read in sequence, in synchronism with the scanning of the monitor display and the extraction of image data from the store 20. They are applied to the switching circuit 22 in the printed circuit board 21, with the result that the signals on the output of the video data unit 21 represent alternately a pixel of image $I_1$ and a pixel of image $I_2$. The pixel values are applied to a logarithmic look-up table LUT 24, the output of which goes to a summing circuit 25.

The value A which determines the relative contents of the two images in the final image is applied through a switching circuit 26 to a logarithmic look-up table LUT 27. The value A is also applied to a complementing circuit 19 the output (1-A) of which is applied to the logarithmic look-up table LUT 27 when the switching circuit 26 is in its other condition. The operation of the switching circuit 26 is controlled by the output of the mask memory 23 in synchronism with the operation of the switching circuit 22. The output of the look-up table LUT 27 goes to the adding circuit 25.

It will be seen that the output of adder 25 is alternately (log $I_1$ + log A) and (log $I_2$ + log (1-A)) and these alternate signals are applied to an anti-logarithmic look-up table LUT 28. The output of table LUT 28 is applied alternately directly to an adder 29 and through a delay circuit 30 to the adder 29, by means of a switching circuit 31 which again operates under the control of the output of the mask memory 23. Thus, the output of the adder 29 is a series of pixels each of which represents a combination of pixels from the two images, at reduced resolution. The density-representing adder output is applied to a look-up table LUT 32 which converts from density to voltage drive and thence through a digital-to-analogue converter 33 to the display 34. It will be understood that the display also receives analogue voltage drive signals from the other two of the colour channels R, G and B on lines 35 and 36 from colour-component channels similar to that shown in FIG. 2, the signals A and (1-A) and the mask memory being common to each channel.

The merging described above with reference to FIG. 2 has been achieved with a relatively small amount of signal processing capacity. Because the two images are stored at half resolution ($512^2$), and are read out in parallel, the mask data is read from the image store; this enables alternate mask pixels to correspond to their respective images. Because the mask read frequently is twice the individual image read frequency, the image pixels for the first and second images are valid for a double mask-pixel duration. Hence a byte-wide signal set (for each channel path), as supplied on the video data printed circuit boards, may carry both images.

The circuit described with reference to FIG. 2 is capable of a number of functions. As described, it carries out image merging at reduced resolution, using the signals $I_1$ and $I_2$ and the control signal A. It will be appreciated that if desired, the merging of the images may take place over a part only of the image area on the display, the area being selected by means of the mask memory 23.

In a second function, a tint (constant amount of colour) may be applied to a single image $I_1$ by replacing the variable signal $I_2$ by a signal of constant value at the video data unit 21. Again, the tint can be applied selectively to areas of the display, to simulate the effect of opaque airbrushing.

The effect of transparent airbrushing can be simulated with the full resolution of the store 20 using $I_1$ and A only, using a formula $$I_o = I_1 + f(A)$$

In the above description, no reference has been made to the problem of signals which go out of limits as a consequence of the signal processing. It will be understood that suitable overflow detection circuits and limiting circuits of known kind are included in a practical embodiment to deal with this problem.

The video data printed circuit board may contain, in addition to the switching facility, means for converting a parallel input from the image memory data bus to serial form, together with means for inserting the cursor or colour patch into the image, for example.

I claim:

1. A method for modifying an image, comprising storing two images in first and second portions of an image store; storing in a further 1-bit store, having the same number of locations as the image store, a mask consisting of alternate 1's and 0's; and using an output of the further 1-bit store to select pixels from the two portions of the image store alternately and to select A and (1-A) as a multiplying factor, alternately, where $0 < A < 1$; and adding each pixel from the first image, after multiplication by A, to a corresponding pixel from the second image after its multiplication by (1-A).

2. A method according to claim 1, wherein the same value is used for each pixel of the second image, whereby a constant amount of colour is applied to each pixel of the first image so as to provide a tint.

3. A method according to claim 1, in which the modified image is shown on a display, and in which the contents of the mask store are such that only a part of the first image is modified in accordance with the second image, the remaining part of the first image being unmodified on the display.

4. Apparatus for modifying an image, and displaying the modified image on a image display means comprising:
   a first image store;
   a second image store;
   a mask store storing alternate ones and zeros;
   means responsive to the mask store to select pixels from the first and second image stores alternately in accordance with the stored ones and zeros;
   means responsive to the mask store to select respective multiplying factors A and (1-A) (where $0 < A < 1$) in accordance with the stored ones and zeros;
   aritmetic means for multiplying a first image pixel value $I_1$ by A to obtain a first product and a value $I_2$ for a corresponding pixel of the second image by (1-A) to obtain a second product and for adding the products to form a sum; and
   means utilizing the sum of the products to control the image display means.

5. Apparatus in accordance with claim 4, wherein the means for adding the products includes a summing circuit connected to receive one of the products directly and the other through a one-pixel delay element, whereby the signals for corresponding pixels of the first and second images are received simultaneously by the summing means.

6. Apparatus in accordance with claim 4, in which the arithmetic means includes a first logarithmic means to which first and second signals are applied alternately; first summing means for adding the logarithm of a value for a first image pixel to the logarithm of the multiplying factor A, and the logaritm for the value of a corresponding second-image pixel, to the logarithm of the multiplying factor (1-A);

and antilogarithmic means receiving the output of the first summing means and providing alternately signals representing the product of the first image pixel value and the factor A, and the product of the second image pixel value and the factor (1-A) and first summing means for adding two signals received in succession from the anti-logarithmic means to provide an output for controlling the display means.

* * * * *